Sept. 11, 1962     J. H. EAGLE ETAL     3,053,711
SPLICING EQUIPMENT FOR FILM AND TAPE
Filed July 31, 1957
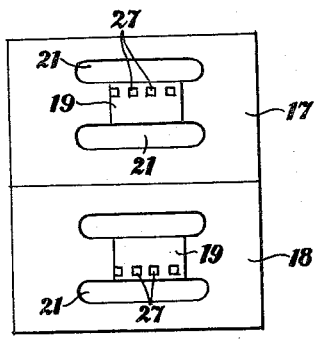
Fig.4
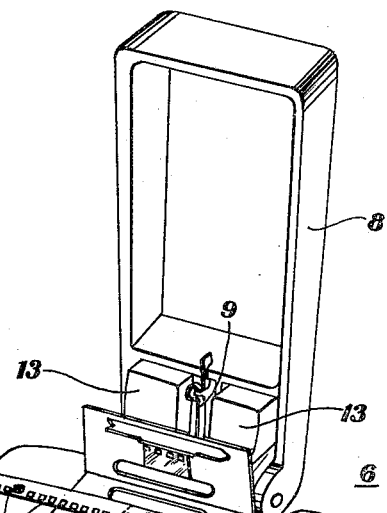
Fig.3
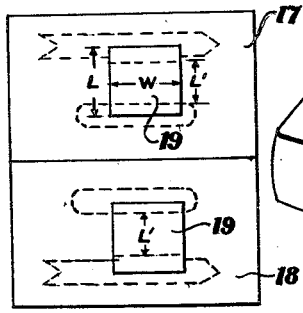
Fig.5     Fig.1
Fig.6
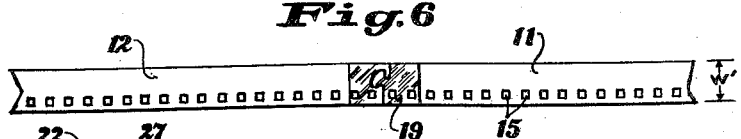
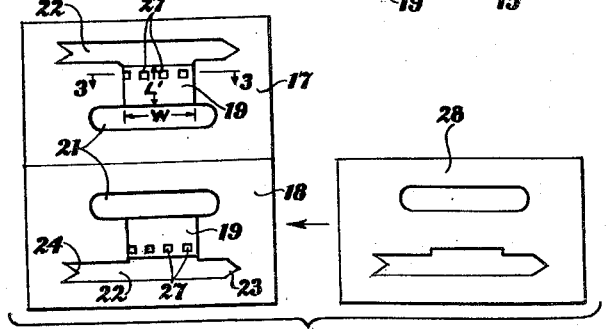
Fig.2
John H. Eagle
Henry E. Brayer
INVENTORS
BY R. Frank Smith
Steve W. Grambow
ATTORNEYS United States Patent Office 3,053,711
Patented Sept. 11, 1962

3,053,711
SPLICING EQUIPMENT FOR FILM AND TAPE
John H. Eagle and Henry E. Brayer, Rochester, N.Y., assignors to Eastman Kodak Company, Rochester, N.Y., a corporation of New Jersey
Filed July 31, 1957, Ser. No. 675,449
3 Claims. (Cl. 154—43)

This invention relates generally to the splicing of web material, and more specifically to an adhesive patch applicator for film splicing adapted to apply an adhesive patch to the abutting ends of film strips.

Several situations exist in which the splicing of film strips is necessary and important. One such situation is where it is desired to join the ends of a plurality of distinct film rolls to form a single large roll having increased projection time. This obviates the necessity of frequent starting and stopping of the projector for the loading of film and results in increased convenience as well as a saving in time to the operator. Proper splicing is also important and necessary in the repair of film that has become fractured or broken in use. In addition, it is often desired to delete a section of film from a filmstrip, or to insert a new section of film therein. Now one of the methods of film splicing employed heretofore utilized means to initially scrape or remove the emulsion at and near the end of one or both of the film strips. Then a coating of a suitable cement or adhesive was applied to the scraped ends of the film strips and a patch placed thereover to complete the splice. Although this method accomplishes a film splice, it has the disadvantage of being complicated, time consuming, messy, and ofter does not result in a satisfactory splice. Other methods and apparatus presently in use for film splicing have the same disadvantages as the foregoing method.

Therefore, one of the objects of the present invention is to provide an adhesive patch applicator for splicing film strips that overcomes the foregoing recited objections of prior known film splicing methods and apparatus.

A further object of this invention is the provision of an adhesive patch applicator for splicing film strips that is economical, and may be applied rapidly and conveniently thereto to produce a highly efficient and satisfactory splice.

A more specific object of this invention is the provision of an adhesive patch applicator for splicing film strips adapted to quickly, conveniently and reliably transfer an adhesive patch from the applicator to abutting ends of the strips to complete the splice.

Objects and advantages other than those set forth will be apparent from the following description when read in connection with accompanying drawings, in which:

FIG. 1 is a perspective view of a film splicer showing an adhesive patch applicator mounted thereon and a film strip placed thereover in abutting relation in preparation for splicing;

FIG. 2 is an elevation view of the adhesive patch applicator in an opened position and showing a separator element that is interposed between the two flaps of the applicator;

FIG. 3 is a section view taken along lines 3—3 of FIG. 2;

FIG. 4 is an elevation view of another embodiment of this invention;

FIG. 5 is an elevation view of the applicator showing the patch as initially applied thereto, and in dotted lines the apertures severed therethrough; and FIG. 6 shows a completed film splice.

As shown in the drawings, this invention is used in connection with a splicer 6 having a base 7 and an arm 8 pivotally mounted on one edge of the base 7. The arm 8 carries a thin cutting blade 9 of irregular shape adapted when the arm 8 is pressed downwardly to sever the overlapped ends of film strips 11, 12 to form a dovetail projection one film strip 11 and a complementary indentation on the other film strip 12. The arm 8 further carries rubber pressure pads 13 for holding the ends of the filmstrips 11, 12 on the base 7 during the cutting operation and for stripping the severed film from the cutting blade 9 when the arm 8 is raised. The base 7 is provided with locating pins 14 adapted to receive the sprocket perforations 15 of the film to properly position the film strips 11, 12 with respect to the cutting blade 9.

A preferred form of the adhesive patch applicator of this invention is shown in FIG. 2 as formed from a unitary support member of heavy paper or cardboard that is folded or scored along its center line to provide two hinged flaps 17, 18 adapted to be arranged in overlapping relation. An adhesive patch 19 having a predetermined width W and an initial length L' as seen in FIG. 5 greater than the width W' of the film being spliced is affixed to the underside of each flap 17, 18. Each adhesive patch 19 is preferably made of a thin transparent material such as Mylar having excellent strength characteristics. This adhesive patch 19 is held in position on the support member by a "low tack" pressure sensitive adhesive applied to the support member and having just enough adhesive strength to hold the patch 19 thereon. Although applicant prefers to apply the "low tack" adhesive to the support piece, it is obvious that the adhesive could be applied to one side of the patch 19. The opposite side of the patch 19 which is to be pressed against the film is coated with a "high tack" coating on the support member. In addition to the differential adhesive effect obtained by using "low tack" and "high tack" adhesives, the effective adhesive areas may be made different by varying their over-all area or by embossing the surface of the flaps. The flaps 17, 18 are provided with registering apertures 21, 22 therethrough formed by a cutting die, not shown, to form a rib therebetween. The apertures serve the dual purpose of severing the adhesive patch 19 to the described length L' as seen in FIGS. 2 and 5 which is substantially equal to the width of the film W', and to further provide a postioning means for locating the applicator on the base 7 in a specified position. Although any number of positioning means can be used, applicant prefers to use the aperture 22 as a positioning means. The aperture 22 is shaped substantially as an arrow, having an arrow head 23 at one end and a tail 24 at the other adapted to receive complementary bosses 25, 26 respectively formed by the base 7 to position the applicator thereon in only one position. The patch 19 and the applicator are further provided with openings 27 therethrough conforming to the sprocket perforations 15 in the film punched out by the cutting die.

When the flaps 17, 18 of the applicator are arranged in overlapping relation, the adhesive patches 19 are placed in register and the "high tack" adhesive surfaces face one another. A separator element 28 interposed between the two flaps 17, 18 as indicated in FIG. 2 prevents adhesion of the patches 19. The separator element 28 may be formed of a specially processed paper or any other suitable material to which the adhesive will not readily adhere. The element 28 also may have embossed surfaces that further reduce the likelihood of the adhesive patch 19 adhering strongly thereto.

In the modification of the invention shown in FIG. 4, the positioning means is eliminated. An applicator of this type is held on the base 7 by the locating pins 14 engaging the complementary openings 27 of the applicator.

Both of the modifications of the invention disclose applicators having hinged flaps 17, 18 adapted to be arranged in overlapping relation. Each flap has an adhesive patch 19 thereon. Since the film strips 11, 12 to be spliced are interposed between the flaps 17, 18, it is apparent that during a splicing operation the applicator will apply an adhesive patch 19 on each side of the film strips 11, 12. If desired, the applicator may be severed along the fold line forming unitary flaps 17 and 18 each containing a single adhesive patch 19 which during a splicing operation is applied to only one side of the film strips 11, 12. Where it is desired to apply a patch 19 to both sides of the film strips 11, 12, two of the unitary flaps are used, one for each side.

To manufacture applicators of the type disclosed in this application, transporting means of any known type are provided to advance a web of applicator stock material. As the material is advanced, means are provided to apply a "low tack" adhesive coating to the material. Upon further advance, means are operable to apply adhesive strips 19 of length L onto the "low tack" adhesive coating, the side of the strips 19 not in contact with the material having a "high tack" adhesive coating. The material is then subjected to a folding means for folding the material along a center line to form spaced apart overlapping flaps 17, 18. Another means is brought into play to insert a strip of separator material 28 between the overlapping flaps 17, 18 which are then closed. The material is then subjected to a cutting action that simultaneously severs the adhesive patches 19 to a length L′ substantially equal to the width W′ of the film to be spliced, provides a positioning means for the applicator, imparts the sprocket perforations 27 to the adhesive patches 19, and severs the finished applicators from the strip material. Where the applicator is of the unitary flap type, the folding means is eliminated and the separator material 28 is placed in register with and in overlapping relation to the applicator material.

In the operation of this invention, let us assume that it is desired to splice two film strips 11, 12 together. Initially, the filmstrips are placed on the locating pins 14 of the base 7 with the ends in overlapping relation and the cutting arm 8 depressed to sever the film forming a dovetail projection on one strip 11 and a complementary indentation on the other strip 12. The film strips 11, 12 are removed from the base 7 and a folded applicator removed from a convenient storage receptacle 29 formed by the base 7. The applicator is opened, the separator element 28 discarded and the opened applicator positioned on the base 7 as shown in FIG. 1 with the positioning aperture 22 receiving the complementary bosses 25, 26 carried by the base. Although the applicator is placed on the splicer base 7, any plate member provided with suitable locating pins 14 and bosses 25, 26 can be used. The film strips 11, 12 are repositioned on the locating pins 14 over the applicator flap 18 with the abutting ends of the film on top of the lower adhesive patch 19 and in engagement with the "high tack" adhesive coating. Then the upper flap 17 is lowered bringing the upper adhesive patch 19 into engagement with the filmstrips 11, 12. The upper flap 17 is pressed down firmly to provide a good adhesive bond between the coatings and the film strips 11, 12. The applicator is removed from the base 7, and the flaps 17, 18 opened transferring the adhesive patches 19 to the film strips 11, 12 to form a spliced film as shown in FIG. 6. The transfer of the adhesive patches 19 from the flaps 17, 18 of the applicator to the film strips 11, 12 occurs because the patches 19 adhere more strongly to the film strips 11, 12 than to the applicator by virtue of the difference in adhesive strength of the coatings.

Although only two embodiments of the present invention have been illustrated and described herein, it will be apparent to one skilled in the art that various changes or modifications, singly or collectively, may be made therein without departing from the essence of the invention or from the scope of the appended claims.

We claim:
1. A patching device for use with a base member having locating pins complementary to film perforations for splicing the ends of a pair of aligned perforated filmstrips, comprising: a support member; a patch having one side thereof removably secured to said support member by an adhesive coating of a predetermined strength, the opposite side of said patch having an adhesive coating of a greater strength than said predetermined strength, said patch and support member further having openings therethrough adapted to register with said film perforations; and said support member further having a pair of parallel, spaced-apart cut-out portions for limiting the length of said patch substantially equal to the width of said filmstrips.

2. A patching device for splicing the ends of a pair of aligned perforated filmstrips, comprising: a pair of hinged flaps; a pair of patches, each patch having one side thereof removably secured to one of said flaps by an adhesive coating of a predetermined strength, the opposite sides of each patch having an adhesive coating of a greater strength than said predetermined strength, each patch and its complementary flap further having openings therethrough adapted to register with said film perforations; and each flap further having a pair of parallel, spaced-apart cut-out portions for limiting the length of its patch substantially equal to the width of said filmstrips.

3. The invention as defined in claim 1 wherein one of said cut-out portions in said flap is unsymmetrical and cooperates with a complementary projection on said base so that said flap can be positioned in only one position.

References Cited in the file of this patent

UNITED STATES PATENTS

| | | |
|---|---|---|
| 2,031,275 | McLaurin | Feb. 18, 1936 |
| 2,506,933 | Mercer | May 9, 1950 |
| 2,608,503 | Meyer | Aug. 26, 1952 |
| 2,672,180 | Nichols et al. | Mar. 16, 1954 |
| 2,794,489 | Drummond | June 4, 1957 |
| 2,842,184 | Manchester | July 8, 1958 |
| 2,862,846 | Blackford et al. | Dec. 2, 1958 |

FOREIGN PATENTS

| | | |
|---|---|---|
| 26,706 | Great Britain | Nov. 17, 1910 |